UNITED STATES PATENT OFFICE.

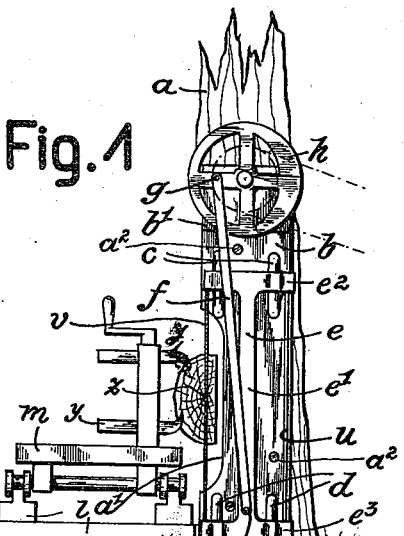
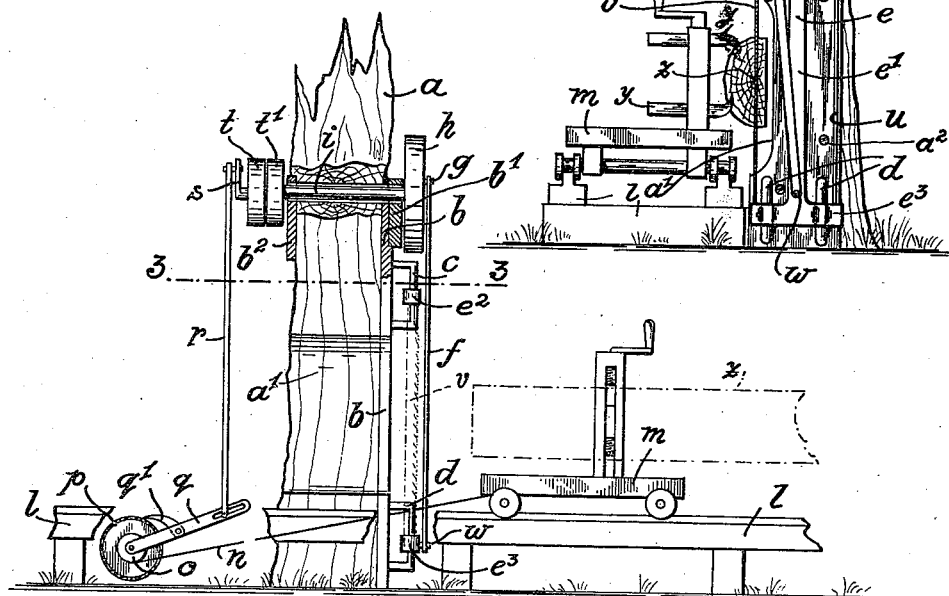
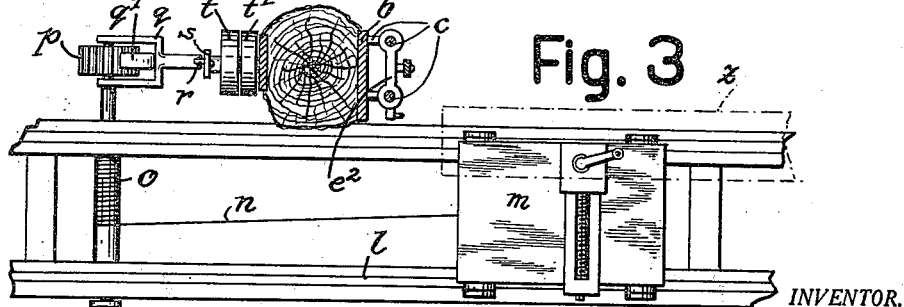

GOTTFRIED MÜLLER, OF SUMISWALD, SWITZERLAND.

FRAME SAW.

1,421,533.  Specification of Letters Patent.  Patented July 4, 1922.

Application filed December 3, 1920. Serial No. 428,039.

*To all whom it may concern:*

Be it known that I, GOTTFRIED MÜLLER, a citizen of the Republic of Switzerland, residing at Sumiswald, in the Canton of Bern, Switzerland, have invented certain new and useful Improvements in Frame Saws, of which the following is a specification.

The present invention relates to power frame saws and more specifically to a transportable saw mill mechanism, and the particular object of the invention is to provide merely such essential elements of a saw mill as are readily transportable and of such conformation and construction that they may readily be attached to any natural or existing standing column, such as a tree trunk, thereby avoiding the necessity for always carrying such a column along with the saw mechanism proper.

My invention will best be understood when described in connection with the accompanying drawing, in which Fig. 1 is a front elevation of the saw mill; Fig. 2 is a side view, partly in section and mutilated to expose otherwise hidden parts; Fig. 3 is a top view and section on line 3—3 of Fig. 2.

The standing column $a$, which for instance may be a tree trunk, is dressed down to present opposite flat faces. A heavy wooden board or metal plate $b$ is suitably secured to the column, for instance by means of screws $a^2$, and there are spacedly mounted on this board pairs of guide members $c$ and $d$ on which is vertically reciprocably guided the saw gate $e$. This latter, as shown by way of example, is of substantially I-shape, with a longitudinally directed narrow body $e^1$ and cross-heads $e^2$ and $e^3$ respectively at the extremities. A tension member $u$ connects these cross-heads at one side, and a saw blade $v$ is stretched between them at the other side as clearly shown in Fig. 1. The saw gate $e$ is reciprocated by means of the pitman $f$, whose lower end is fulcrumed at $w$ to the lower end of the gate $e$ and whose upper end is fulcrumed to the pin $g$ extending from the fly wheel $h$. This latter is keyed on the one extremity of a shaft $i$ which operates through a bore hole extending clear through the column $a$. Bearing cheeks $b^1$ and $b^2$ are provided at the opposite mouths of the bore hole to journal the respective shaft portions, the cheek $b^1$ forming an extension of the member $b$, and the separable cheek $b^2$ being suitably secured to the column $a$.

At the side where the saw blade operates the support board or plate, and correspondingly also the standing column, is recessed as at $a^1$ to bring the zone of operation on the log as near as possible to the vertical center line to properly balance the structure.

The left-hand portion of shaft $i$, protruding from the column, supports the fast and loose pulleys $t$ and $t^1$ respectively, which are operated in any suitable manner, for instance by a gasoline engine, a water turbine, or where current is avialable by an electromotor. The extremity of this shaft portion is cranked as at $s$ and a draw rod $r$ is linked thereto, the lower end of which is adjustably linked to an oscillating lever $q$ whose pawl $q^1$ cooperates with a ratchet wheel $p$ rigidly connected to a drum $o$. The latter is rotatably mounted in a track structure $l$ extending transversely of the standing column and on which travel log supporting platforms $m$, of which only one is shown here. A rope or chain $n$ is secured at one end to the platform and its other end is wound around the drum $o$ on operation of the ratchet device or of the handle $x$, which causes the platform, to which the log $z$ is clamped by the adjustable dogs $y$ (Fig. 1), to be stepwise advanced toward and past the saw blade.

The several parts of the saw mill are readily transportable in knock-down state to the place of operation where a standing tree trunk is quickly prepared by having two opposite sides chopped flat and the recess $a^1$ cut out, in case the trunk is rather thick, and by boring transversely through the trunk so that the members $b$, $b^1$ and $b^2$ can be fastened thereto and shaft $i$ passed through the bored hole. The other parts are then assembled, the log to be sawed is placed on the trucks and finally the power is applied to the fixed pulley, when the saw gate will vertically reciprocate and the platform $m$ be drawn toward the saw blade. By varying the throw of the pawl lever $q$, the speed of travel of the platform, or in other words, the velocity of feed of the log, can be regulated to suit requirements.

What I claim is:—

A transportable saw mill mechanism of the character set forth, comprising in combination, a saw carrying frame, a power shaft with a connection to said saw frame for vertically reciprocating the latter, a supporting board, means thereon for supporting and guiding said saw frame, shaft mounting means associated with said board, and a separate shaft mounting means, the two said mounting means adapted to journal said power shaft transversely of said guide means, and said supporting board and said shaft mounting means adapted to be mounted on opposite sides of a standing column perforated to freely receive said shaft.

In testimony whereof I have hereunto set my hand in the presence of two subscribing witnesses.

GOTTFRIED MÜLLER.

Witnesses:
 D. AEBY,
 J. ALLEMAN.